United States Patent Office 2,921,443
Patented Jan. 19, 1960

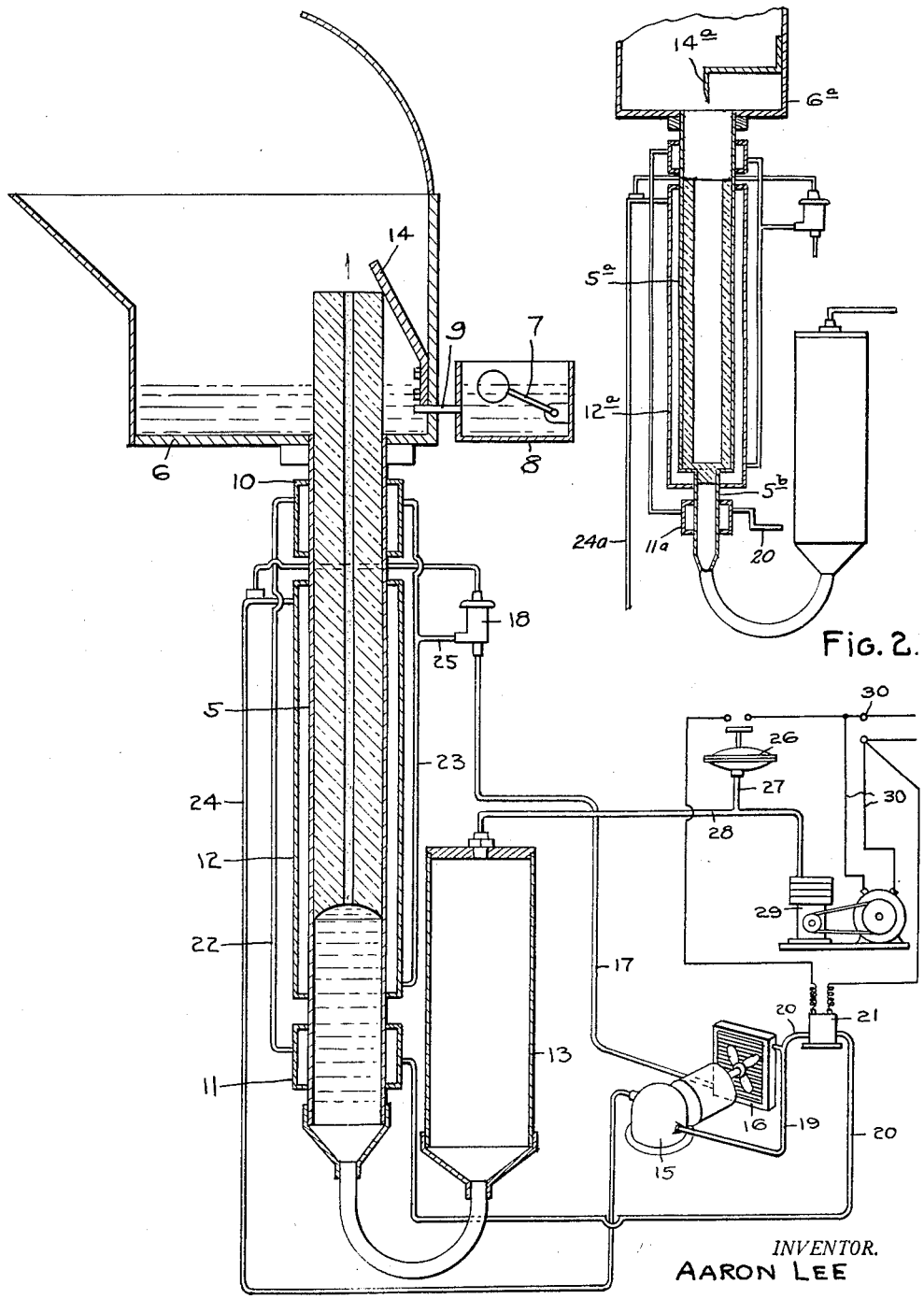

2,921,443

METHOD OF AND MACHINE FOR MANUFACTURING ICE CUBES AND CRUSHED ICE

Aaron Lee, Miami Beach, Fla.

Application January 23, 1957, Serial No. 635,643

12 Claims. (Cl. 62—69)

This invention relates to machines for producing ice, either in the form of, so called, ice cubes or in the form of even smaller pieces in the nature of, so called, crushed ice.

The primary object of the invention is to provide a machine of this general character of such simplicity that it may be economically manufactured and of such efficiency that a small and inexpensive type of machine will produce as much ice as has heretofore been produced by much larger and more expensive machines.

Up to a certain point this machine resembles and utilizes features disclosed in patents heretofore issued to me and Eli Lieberman. Among these patents is Patent 2,595,588, issued May 6, 1952 and reference to this patent will make clear the differences between the present application and said prior patents.

Like Patent 2,595,588 the invention of the present application contemplates the freezing of water in elongated tubes during the freezing cycle of a conventional refrigerating mechanism, thawing the frozen water enough to release the ice body from its engagement with the elongated tube, ejecting the ice body by the introduction of a pressure medium, air for example, and breaking the ejected ice body into a multiplicity of smaller pieces, by impacting it against a suitable ice breaking medium that is disposed adjacent the mouth of the elongated tube and in the path of the ejected body of ice.

The improvements which characterize the present invention will be best understood and appreciated by reference to the accompanying drawing, wherein:

Figure 1 is a vertical section of a form of freezing mechanism adapted to produce ice cubes; with conventional refrigerating mechanism shown in diagrammatic association therewith, and Figure 2 is a vertical sectional view of a form of freezing mechanism adapted to produce ice in smaller particles in the nature of crushed ice.

Referring now to Figure 1 of the drawing 5 designates an elongated freezing tube the top of which opens into the bottom of a pan 6. Water within said pan is maintained at a determined level by a float valve 7 in an associated pan 8, the two pans being in communication with each other through pipe 9. Upper and lower relatively short jackets 10 and 11 surround the upper and lower portions of tube 5, while a longer jacket 12 surrounds the intermediate portion of said tube 5. The lower end of the tube is in communication with an air accumulator 13. In the freezing and thawing cycles refrigerant and hot gases are utilized to first freeze a body of ice in tube 5 and then thaw the same loose from its engagement with the walls of tube 5, to permit the forcible ejection of the ice column under the action of air pressure from the accumulator, and the breaking of the ejected ice column into a multiplicity of cubes by impacting the said column against an angularly disposed breaker plate 14 in pan 6. As so far described the device is quite similar in construction and operation to the structure shown in Figure 5 of Patent 2,595,588. Here the resemblance ceases because in that patent the refrigerant and the thawing gases are conducted through a series of jackets upon a series of freezing tubes. The result is that the first tube to discharge its ice content must remain in idleness, as far as the exercise of any freezing action is concerned, until the last tube has discharged its ice content. While I may, in machines of large capacity, employ a plurality of freezing tubes the present invention contemplates making every tube and its accumulator, independent of every other tube, to the end that just as soon as thawing and ejection of the ice takes place, the machine will go immediately into the freezing cycle, with the important increase in efficiency, hereinafter set forth.

Referring again to Figure 1, 15 designates the compressor and 16 the condenser of a conventional refrigerating apparatus. The liquid line 17 leads from the condenser to the usual expansion valve 18. A hot gas line 19 leads from the compressor to the condenser. A branch hot gas line 20 taken off of line 19 is controlled by a hot gas solenoid valve 21. When this solenoid valve is opened hot gas flows through line 20 to jacket 11, thence through line 22 to jacket 10, thence through line 23 to the lower portion of jacket 12 and from the upper portion of jacket 12, through suction line 24 back to the compressor. A branch line 25 leads from the expansion valve 18 to line 23 to deliver refrigerant to and to initiate a freezing cycle in elongated jacket 12 after the solenoid valve 21 closes. Electric current for the actuation of the solenoid valve 21 is delivered under control of a pressure actuated switch 26. Air pressure for the actuation of this switch is taken through connection 27 from an air line 28. Line 28 leads from a small, low capacity, electrically driven air pump 29, which runs continuously and the current supply leads of which are indicated at 30. Air from the pump is delivered through line 28 into accumulator 13. In the initial stages of the freezing operation in tube 5 under the action of the refrigerant in jacket 12, air delivered from the pump flows upwardly in the form of a stream of bubbles through the center or core of the column of ice that is being formed. This insures that the ice will freeze clear because of the slight turbulence created. The air pump 29, is designedly made of such low capacity that it may run continuously and yet deliver only enough air to maintain a stream of air bubbles upwardly through the core of the ice body until the freezing proceeds to such point as to close the core of such body. A small pump such as those used to aerate the water in home aquariums has been found to be sufficient for my purpose. Such a pump is of very low cost and since it runs continuously no pressure controlled devices are required to cut it into and out of action. When the freezing has proceeded to the point where the air can no longer flow upwardly, air pressure builds up in the accumulator to the point where the pressure actuated switch 26 closes, the solenoid valve opens and hot gases are admitted to hot gas line 20. The hot gas passes, first through lower jacket 11 (Fig. 1) thence through line 22 to upper jacket 10, then downwardly through line 23 into the lower portion of jacket 12 and from the upper portion of said jacket, through suction line 24 back to the compressor. Thus the upper and lower jackets 11 and 10 function only to thaw loose the end portions of the ice column before the intermediate portion is thawed loose from tube 5. Then the accumulated air pressure in accumulator 13 acts to propel the frozen ice body forcibly upward and against the deflecting breaker plate 14, as described. The jacket 12 constitutes the main freezing element, the jackets 10 and 11 functioning, as stated, as thawing units. The reason that jackets 10 and 11 do not exercise the same freezing action as does jacket 12, is that 12 has the suction line 24 connected to its upper outlet end, while jackets 10 and 11 have no direct connection with the suction side of the compressor and therefore no circulation of refrigerant takes place in said jackets. The hot gases from said jackets pass through 23 in the defrosting cycle; by-passing the then idle, expansion valve 18, and get back to the compressor, but only after passing through jacket 12 and exercising their final thawing function therein.

The operation of the structure illustrated in Figure 2 is substantially like that already described except that in Figure 2 the tube 5a corresponding to tube 5 is provided with a lower portion 5b of reduced diameter and the jacket 12a is carried down far enough to embrace this portion of reduced diameter. The purpose of this arrangement is to provide an area in which a plug of ice will freeze and shut off the air flow, before the column of water thereabove freezes to its center. Thus at the time the plug freezes to shut off the air flow, upwardly, the ice thereabove will be of cylindrical form. That is its center will present a hole through the ice body. When in the subsequent thawing cycle the ice plug melts, the said plug and the cylindrical shell of ice will be expelled against a substantially horizontal knife or cutter bar 14a, which overlies and extends across tube 5a and slices the ice body into a multiplicity of small pieces, in the nature of crushed ice. The employment of a cutter bar for thus producing ice in small particles, in lieu of an oblique deflector for snapping off ice cubes, is disclosed in Patent 2,648,955, issued to me on August 18, 1953.

The thickness of the walls of the cylindrical shells of ice, at the time of ejection, may be varied by varying the diameter of the reduced portion of the tube with respect to the diameter of the main body of the tube. If, for example, a very small diameter reduced portion were employed, the plug would freeze the passage shut before the side walls of the ice body had frozen to any considerable thickness, while if the reduced portion approximated the main body of the tube in diameter the said side walls of the ice body would have frozen to a considerable thickness before the freezing of the plug had been completed.

By making the freezing units, to wit the freezing tube, accumulator, air pump and associated parts as independent entities, with the capacity to have the tube enter upon a freezing cycle just as soon as the ice has been ejected and the hot gas has been shut off by the resultant quick drop in air pressure in the accumulator, I am able to produce as much ice with a relatively small and inexpensive single tube machine as has heretofore been produced by much larger and more expensive multiple tube machines. This is due to the fact that by this method much more time is devoted to actual freezing of the ice by the tube. For example the entire defrosting action in this machine is from thirty to forty-five seconds, in comparison with a cycle of from nine to ten minutes in a structure like that of Patent 2,595,588 where a time clock must complete a cycle of operation, covering a number of tubes, before any tube can again go into a freezing cycle.

Not only is this improved machine so much more efficient in operation but its great simplicity makes it very economical to manufacture. For example by my method I am able to dispense with many instrumentalities shown in Patent 2,595,588 such as the large and relatively expensive motor, air compressor and air tank, the regulators 58 and 62, the time clock, the cold control 125 in Figure 7 of said patent, the pressure control for the air compressor, the restrictors 55, the air check valves and, since my small pump runs continuously, the pressure control for the same. It is to be noted that in this invention the air supply is locally generated by a locally-installed air pump of such small capacity that up to the time that the circulation is stopped by the freezing shut, of the passage through the column of ice, the entire output from the air pump may pass through the ice column without excessive agitation of the water being frozen. Up to the time that the passage freezes shut there is pressure only slightly above atmospheric passing through the ice column. By using this locally-generated and wholly locally-controlled air supply, I am able to accurately control the force of ejectment of the ice column, when said column is released by the thawing action. This accurate control of the air is of importance because if the pressure which accumulates in the accumulator between the time of the freezing shut of the column is too little there may result an incomplete ejecting action; while if it is too great the ice column shoots out of the tube with excessive force and brings about excessive shattering of the ice. By local generation of the air pressure I mean, a structure in which the air pressure is generated wholly by my apparatus. In this respect it differs from some prior devices employing city water pressure as the ejecting medium. Such an arrangement is disclosed in my own prior Patent 2,597,008. However, it was found that uniformity of action cannot be had from the use of city water pressure because such pressure varies very widely, not only from neighborhood to neighborhood but even from floor to floor in the same building. Even the opening of several faucets simultaneously on the supply line may bring about such pressure reduction as will result in sluggish and imperfect ejection of the ice column.

It will be understood that I contemplate using, in connection with this new machine, any of the conventional devices commonly employed in apparatus of this sort such as an ice bin thermostat or thermal bulb to control the operation of the machine by the presence or absence of a desired amount of ice cubes or crushed ice in such bin. Such a device is disclosed at 104 in Figure 1 of my Patent 2,595,588. A bin to receive the broken ice will be employed as shown in my Patent 2,595,588.

My improved machine is not affected by changes in ambient temperatures. As long as air can bubble through the core of the ice body, being formed, the machine will continue to freeze, regardless of surrounding temperatures. Consequently it requires no adjustment because of changes in ambient temperatures.

It will be understood that in the absence of a hot gas line 20 and valve 21 the conventional refrigerating mechanism consisting of compressor 15 and condenser 16 acts to normally deliver refrigerant to line 17 and the expansion valve. This normal freezing cycle is changed to a thawing cycle when the hot gases are diverted to branch line 20 by the opening of valve 21.

While I have described the hot gases as constituting the means for effecting a thawing cycle the invention contemplates the use of any equivalent means for accomplishing the thawing. For example the closing of switch 26 could be utilized to energize a heating coil disposed about the freezing tube, the important point being that the freezing cycle is initiated by the drop of pressure in the accumulator which takes place when the ice is ejected. Thus no determined time cycle must elapse, such as with a time clock, to effect the desired result.

The invention is not limited to the construction described but includes within its purview whatever changes fairly fall within either the terms or the spirit of the appended claims.

I claim:

1. A machine for producing ice and delivering the same in small pieces comprising an elongated freezing tube, having an open upper end, a water supply pan into which the upper end of said tube opens, an accumulator and from which accumulator air passes continuously upward through the freezing tube as long as an open passage is present through the water being frozen, individual to and with which the lower end of the tube is in communication, an air supply generating means local to the machine and means for conducting air therefrom into said accumulator, means forming a path for and alternately conducting refrigerant and thawing gases about said freezing tube, a refrigerating mechanism which includes a refrigerating line and a hot gas line, valvular means controlling the passage of hot gases from said hot gas line to said path about the freezing tube, pressure controlled means in communication with and subjected to the pressure within the accumulator, means for actuating said valvular means under control of the pressure controlled means to permit passage of hot gases to said path when the pressure controlled means is activated by rise of pressure to a predetermined degree in the accumulator caused by the freezing of water in the tube and the resultant closing off of the passage of air upwardly through the freezing tube and an ice breaking element disposed adjacent the open end of the tube against which the frozen ice body is forcibly impacted by the accumulated air pressure and broken into small pieces when said ice body is thawed by the hot gases enough to release it from the walls of the freezing tube.

2. A structure as recited in claim 1 wherein the path for said hot gases consists of a plurality of jackets disposed about the freezing tube and conduits through which the refrigerant and hot gases are alternately conducted from the refrigerating mechanism to said jackets.

3. A structure as recited in claim 1 wherein the air supply means consists of a pump of such small capacity as to deliver only enough air to create a stream of bubbles upwardly through the body of ice that is being frozen in the freezing tube.

4. A machine of the character described comprising a vertical, elongated freezing tube, a water pan into which the upper end of said tube opens, means for maintaining a determined water level in said pan, an ice breaking means, disposed adjacent the mouth of the tube, serving to break a body of ice that is forcibly ejected from the tube into a multiplicity of pieces, jacketing means associated with the tube, a refrigerating mechanism comprising a compressor and a condenser, means for alternately conducting refrigerant and hot gases to said jacketing means for setting up freezing and thawing cycles in the tube, an accumulator individual to and in direct connection with the lower end of the freezing tube, local air supply generating means in the machine, an air supply line leading therefrom to the accumulator, the means for conducting hot gases to the jacketing means comprising a hot gas line which, when open delivers hot gas from the compressor of the refrigerating mechanism to said jacketing means instead of to the condenser of the refrigerating mechanism, a hot gas solenoid valve in the hot gas line, a pressure actuated switch controlling the said solenoid valve and means for subjecting the pressure actuated switch to the pressure within the accumulator to thereby close the hot gas valve and cut off hot gases to the jacketing means when the pressure within the accumulator drops, as the ice body within the tube is thawed enough to permit its ejection under pressure accumulated when the freezing of the ice body shuts off escape of air in bubble form through the freezing body of ice.

5. A structure as recited in claim 1 wherein the freezing tube is provided with a portion of reduced cross sectional area adjacent its lower end to provide a point at which an ice plug will freeze the tube closed while the portion of the freezing ice body thereabove is still of cylindrical shell form.

6. A structure as recited in claim 1 wherein the freezing tube is provided with a portion of reduced cross sectional area adjacent its lower end to provide a point at which an ice plug will freeze the tube closed while the portion of the freezing ice body thereabove is still of cylindrical shell form and wherein part of the path for the refrigerant and thawing gases embraces said portion of reduced cross sectional area.

7. A machine for freezing ice and delivering the same in small pieces, comprising an elongated freezing tube having an open upper end, means for introducing water into said tube to be frozen into columnar form, heating and cooling media and means for alternately subjecting the exterior of said tube to heat and cold from said media, an air accumulator in connection with the lower end of said tube, means for continuously feeding air into said accumulator, a pressure actuated element connected to and subjected to the air pressure in the accumulator and means under control of the pressure actuated element for controlling the application of the heating and cooling media to the exterior surface of said tube.

8. The described method of freezing water in the form of an elongated ice body in an open ended container, locally generating and supplying air in such limited quantity to the lower portion of the container as to maintain only a uniform flow of air bubbles upwardly through the ice being frozen, accumulating air pressure when the air flow is interrupted by the freezing closed of the path through the ice body, initiating a thawing cycle under the action of the rise of pressure of the accumulated air and forcibly ejecting and shattering the ice body by the action of the accumulated air pressure when the thawing cycle has released the ice body from engagement with the container.

9. The herein-described method which consists of freezing ice in an elongated tube and discharging the same therefrom by alternately conducting freezing and thawing fluids about said tube, maintaining a locally generated and limited air flow lengthwise through the freezing ice until the ice is frozen to a point to shut off further air flow, accumulating the interrupted air, initiating a thawing cycle by rise of the pressure of the interrupted air, ejecting the ice from the tube by the accumulated volume of air when the thawing has proceeded to the point to release the ice from the tube and immediately initiating a freezing cycle under the influence of the pressure reduction of the air when the ice is ejected by the accumulated air.

10. A method as recited in claim 9 in conjunction with the further step of shattering the ejected ice into a multiplicity of small pieces under the forcible movement of the ice from the tube.

11. The described method consisting of freezing water in elongated tubular form by subjecting water in columnar form to alternate freezing and thawing cycles, locally generating and conducting air under pressure lengthwise through said column until the freezing of the water into ice blocks the further passage of air through the column and utilizing the resultant rise of the air pressure to shift from a freezing to a thawing cycle.

12. The described method consisting of freezing water in elongated tubular form by subjecting water in columnar form to alternate freezing and thawing cycles, supplying and conducting air under pressure lengthwise through said column until the freezing of the water into ice blocks the further passage of air through the column, utilizing the resultant rise of the air pressure to shift from a freezing to a thawing cycle, discharging the frozen column from its position of freezing under the action of said air whose pressure has been elevated by the blocking, and shifting back to a freezing cycle under the influence of the drop in pressure resulting from the discharge of the frozen column.

References Cited in the file of this patent
UNITED STATES PATENTS

| | | |
|---|---|---|
| 1,984,053 | Carraway | Dec. 11, 1934 |
| 2,546,092 | Field | Mar. 20, 1951 |
| 2,595,588 | Lee et al. | May 6, 1952 |
| 2,633,005 | Lauer | Mar. 31, 1953 |
| 2,648,955 | Lee et al. | Aug. 18, 1953 |
| 2,747,379 | Field | May 29, 1956 |
| 2,821,070 | Watt | Jan. 28, 1958 |